(12) United States Patent
Noguchi et al.

(10) Patent No.: US 12,098,778 B2
(45) Date of Patent: Sep. 24, 2024

(54) SOLENOID VALVE

(71) Applicant: Eagle Industry Co., Ltd., Tokyo (JP)

(72) Inventors: Hiroshi Noguchi, Tokyo (JP);
Yoshinari Kasagi, Tokyo (JP);
Hiroyuki Iwanaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 17/636,784

(22) PCT Filed: Aug. 17, 2020

(86) PCT No.: PCT/JP2020/030962
§ 371 (c)(1),
(2) Date: Feb. 18, 2022

(87) PCT Pub. No.: WO2021/039462
PCT Pub. Date: Mar. 4, 2021

(65) Prior Publication Data
US 2022/0299126 A1 Sep. 22, 2022

(30) Foreign Application Priority Data
Aug. 29, 2019 (JP) ................................. 2019-156883

(51) Int. Cl.
*F16K 31/06* (2006.01)
*F16K 27/02* (2006.01)

(52) U.S. Cl.
CPC ........ *F16K 31/0655* (2013.01); *F16K 27/029* (2013.01)

(58) Field of Classification Search
CPC .. F16K 31/0655; F16K 31/408; F16K 27/029; F16K 31/0606; F16K 31/0627
See application file for complete search history.

(56) References Cited

U.S. PATENT DOCUMENTS 1,049,845 A * 1/1913 Geissinger ............ F16K 31/046
246/258
2,650,617 A * 9/1953 Wasser .................. H01F 7/1607
335/251

(Continued)

FOREIGN PATENT DOCUMENTS

CN 205190900 4/2016 ............ F16K 31/06
DE 3723959 2/1989 ............ F16K 31/06

(Continued)

OTHER PUBLICATIONS

International Search Report and Written Opinion issued in PCT/JP2018/042066, dated Feb. 5, 2019, with English translation, 18 pgs.

(Continued)

*Primary Examiner* — Umashankar Venkatesan
(74) *Attorney, Agent, or Firm* — HAYES SOLOWAY P.C.

(57) ABSTRACT

A solenoid valve includes: a valve body; a housing which includes a valve seat and a valve chamber; a movable iron core which moves the valve body; a solenoid coil; a fixed iron core configured for moving the movable iron core by causing a current to flow to the solenoid coil; and a sleeve which is disposed inside the movable iron core, in which the sleeve is attached to the housing in such a manner that an open portion of the sleeve is inserted into an open recess portion of the housing communicating with the valve chamber and a gap between the sleeve and the housing is sealed by a seal member.

14 Claims, 8 Drawing Sheets

(56) References Cited

U.S. PATENT DOCUMENTS

| | | | | |
|---|---|---|---|---|
| 2,654,393 | A | * | 10/1953 | Ghormley .............. F16K 31/408 251/38 |
| 2,700,397 | A | * | 1/1955 | Compton .............. F16K 31/408 417/440 |
| 2,999,192 | A | * | 9/1961 | Lambert .............. F16K 31/0655 335/254 |
| 3,262,027 | A | | 7/1966 | Zaleske et al. ................ 317/165 |
| 3,446,473 | A | * | 5/1969 | Barker ................ F16K 31/0651 251/129.05 |
| 3,462,116 | A | * | 8/1969 | Wright, Jr. .......... F16K 31/0651 335/278 |
| 3,818,927 | A | | 6/1974 | Zeuner .......................... 137/110 |
| 3,827,672 | A | * | 8/1974 | Stampfli ............... H01F 7/1607 137/625.65 |
| 3,890,587 | A | * | 6/1975 | Field ..................... H01F 7/1607 335/255 |
| 3,926,405 | A | * | 12/1975 | Arnold ................ F16K 31/0655 251/129.08 |
| 4,074,700 | A | | 2/1978 | Engle ........................ 137/625.27 |
| 4,305,566 | A | * | 12/1981 | Grawunde ............. F16K 31/406 251/44 |
| 4,558,844 | A | | 12/1985 | Donahue, Jr. ................ 251/118 |
| 4,971,116 | A | | 11/1990 | Suzuki ............... G05D 16/2024 |
| 5,076,323 | A | | 12/1991 | Schudt ................ F16K 31/0637 |
| 5,413,308 | A | * | 5/1995 | Hayes ................ F16K 31/0686 251/86 |
| 5,651,530 | A | * | 7/1997 | Krimmer .............. H01F 7/1607 251/129.21 |
| 5,971,356 | A | | 10/1999 | Offenwanger et al. .. 215/129.07 |
| 6,293,513 | B1 | * | 9/2001 | Birkelund .............. F16K 31/408 251/30.03 |
| 6,315,268 | B1 | | 11/2001 | Cornea ................... H01F 7/081 |
| 6,367,434 | B1 | | 4/2002 | Steigerwald ......... F15B 13/0821 |
| 6,619,615 | B1 | | 9/2003 | Mayr ..................... H01F 7/1607 |
| 7,686,038 | B2 | | 3/2010 | Chavanne .............. F16K 31/0631 |
| 8,134,436 | B2 | | 3/2012 | Yasoshima .............. H01F 7/127 |
| 8,998,167 | B2 | * | 4/2015 | Leidig ................. F16K 31/0655 251/83 |
| 9,464,728 | B2 | * | 10/2016 | Herrmann ............. F16K 31/003 |
| 11,072,315 | B2 | * | 7/2021 | Edelmann ............. F16K 39/024 |
| 2002/0007549 | A1 | | 1/2002 | Oishi et al. ...................... 29/596 |
| 2005/0001189 | A1 | * | 1/2005 | Takamatsu .......... F16K 31/0655 251/129.15 |
| 2006/0243938 | A1 | | 11/2006 | Ishibashi et al. ........ 251/129.15 |
| 2008/0308758 | A1 | | 12/2008 | Fukano et al. ........... 251/129.15 |
| 2010/0326552 | A1 | | 12/2010 | Suzuki .............. F16B 13/0402 |
| 2011/0115587 | A1 | | 5/2011 | Ishibashi ........................ 335/255 |
| 2012/0126158 | A1 | | 5/2012 | Yasoshima et al. ..... 251/129.15 |
| 2013/0200283 | A1 | * | 8/2013 | Speer ..................... F16K 31/08 251/65 |
| 2013/0306894 | A1 | * | 11/2013 | Wei ..................... F16K 31/0655 251/359 |
| 2014/0225017 | A1 | | 8/2014 | Leidig ................ F16K 31/0658 |
| 2016/0329143 | A1 | | 11/2016 | Irie et al. ................. H01F 7/081 |
| 2017/0248262 | A1 | * | 8/2017 | Taniguchi ............. F16L 37/146 |
| 2018/0372129 | A1 | | 12/2018 | Kato et al. .............. F15B 13/04 |

FOREIGN PATENT DOCUMENTS

| | | | |
|---|---|---|---|
| EP | 3467362 | 4/2019 | ............ F16K 31/06 |
| GB | 2207222 | 1/1989 | ............... F16K 1/48 |
| JP | 7-27246 | 1/1995 | ............ F16K 31/06 |
| JP | 9-250650 | 9/1997 | ............ F16K 31/06 |
| JP | 2002-27723 | 1/2002 | ............ H02K 33/02 |
| JP | 2002-188747 | 7/2002 | ............ F16K 31/06 |
| JP | 2006-307984 | 11/2006 | ............ F16K 31/06 |
| JP | 2007-211857 | 8/2007 | ............ F16K 31/06 |
| JP | 2010-106899 | 5/2010 | ............ F16K 31/06 |
| JP | 2010-223279 | 10/2010 | ............ F16K 31/06 |
| JP | 2011-108781 | 6/2011 | ............... H01F 7/16 |
| JP | 2011-228568 | 11/2011 | ............... H01F 7/16 |
| JP | 2012-122609 | 6/2012 | ............ F16K 31/06 |
| JP | 2014-110372 | 6/2014 | ............... H01F 7/16 |
| JP | 2014-232768 | 12/2014 | ............... H01F 7/16 |
| JP | 2015-75165 | 4/2015 | ............ F16K 31/06 |
| JP | 2015-517631 | 6/2015 | ............... H01F 7/16 |
| JP | 2015-195301 | 11/2015 | ............... H01F 7/16 |
| JP | 2016-211657 | 12/2016 | ............ F16K 11/07 |
| JP | 2017-157791 | 9/2017 | ............ H01K 42/02 |
| JP | 2019-7572 | 1/2019 | ............ F16K 31/06 |
| WO | WO2015115298 | 8/2015 | ............... H01K 7/06 |

OTHER PUBLICATIONS

International Preliminary Report on Patentability issued in PCT/JP2018/042066, dated May 26, 2020, English translation, 9 pages.
International Search Report and Written Opinion issued in PCT/JP2018/042065, dated Feb. 5, 2019, with English translation, 16 pgs.
International Preliminary Report on Patentability issued in PCT/JP2018/042065, dated May 26, 2020, English translation, 8 pgs.
International Search Report and Written Opinion issued in PCT/JP2020/030962, dated Nov. 2, 2020, with English translation, 14 pgs.
International Preliminary Report on Patentability issued in PCT/JP2020/030962, dated Mar. 10, 2022, English translation, 6 pgs.
Official Action issued in related U.S. Appl. No. 16/754,734, dated Mar. 30, 2022, 29 pages.
Official Action issued in related U.S. Appl. No. 16/756,115, dated Sep. 15, 2021, 12 pages.
Official Action issued in related U.S. Appl. No. 16/756,115, dated Apr. 1, 2021, 9 pages.
Chinese Official Action issued in corresponding Chinese Application Serial No. 201880065703.9, dated Jul. 14, 2021 (12 pages) with translation.
Chinese Official Action issued in corresponding Chinese Application Serial No. 201880065703.9, dated Jan. 27, 2022 (13 pages) with translation.
Chinese Official Action issued in Chinese Patent Application Serial No. 201880065470.2, dated Dec. 8, 2021 (12 pages) with translation.
Chinese Official Action issued in Chinese Patent Application Serial No. 201880065470.2, dated Jul. 2, 2021 (10 pages) with translation.
Japanese Official Action issued in Japanese Patent Application Serial No. 2019-555271, dated Mar. 10, 2022 (6 pages) with translation.
Extended European Search Report issued in EP Patent Appln. Serial No. 20857688.4-1015, dated Aug. 25, 2023, 13 pages.

* cited by examiner

SOLENOID VALVE

TECHNICAL FIELD

The present invention relates to a solenoid valve used to control a flow rate.

BACKGROUND ART

Conventionally, there are known solenoid valves capable of controlling a flow rate of a fluid by adjusting a valve opening degree in such a manner that a current is caused to flow to a solenoid coil to magnetize a fixed iron core, a movable iron core is pulled to the fixed iron core, and a valve body attached to the movable iron core is moved in a following manner to move relative to a valve seat.

In some solenoid valves, the movable iron core is disposed to be guided into a sleeve and a fluid in a valve chamber can flow into the sleeve, so that a force acting in the moving direction of the movable iron core and the valve body is balanced by the pressure of the fluid to reduce the influence of the fluid flowing into the sleeve on the movement of the movable iron core.

As an example of such solenoid valves, a solenoid valve of Patent Citation 1 has a configuration in which the sleeve is fixed to an upper end portion of the fixed iron core by caulking or welding in a sealed state and a lower end portion of the fixed iron core is assembled to a housing through an elastic seal member to prevent a fluid from flowing to the outside. Further, since a fluid flowing from the valve chamber into the sleeve is led to each of an upper end portion and a lower end portion of the movable iron core, the movable iron core can be moved smoothly.

CITATION LIST

Patent Literature

Patent Citation 1: JP 2019-7572 A (Pages 4 and 5, FIG. 1)

SUMMARY OF INVENTION

Technical Problem

In the solenoid valve such as in Patent Citation 1, since a gap between the sleeve and the fixed iron core is sealed by caulking or welding and further a gap between the fixed iron core and the housing is sealed by the elastic seal member, a problem arises in that there are many sealing places and the manufacturing process is complicated.

The present invention has been made in view of such a problem and an object is to provide a solenoid valve with a simple manufacturing process and high sealing performance.

Solution to Problem

In order to solve the foregoing problem, a solenoid valve according to the present invention includes: a valve body; a housing which includes a valve seat and a valve chamber; a movable iron core which moves the valve body; a solenoid coil; a fixed iron core configured for moving the movable iron core by causing a current to flow to the solenoid coil; and a sleeve in which the movable iron core is disposed, wherein the sleeve is attached to the housing in such a manner that an open portion of the sleeve is inserted into an open recess portion of the housing, the open recessed portion communicating with the valve chamber, and wherein a gap between the sleeve and the housing is sealed by a seal member. According to the feature of the present invention, since a gap between the sleeve and the housing is sealed by the seal member, that is, sealing performance on a fluid side space can be ensured by sealing one place, it is possible to simplify a manufacturing process.

It may be preferable that the seal member is an elastic seal member and the elastic seal member is disposed on an outer periphery of the sleeve. According to this preferable configuration, since the crushing rate of the elastic seal member can be easily maintained uniformly even when the sleeve moves in the axial direction, it is easy to maintain sealing performance.

It may be preferable that the sleeve has a tapered surface formed on an outer periphery of an end portion of the sleeve on a side of the valve chamber, the tapered surface being inclined so as to become smaller in diameter toward the side of the valve chamber. According to this preferable configuration, since the sleeve can be guided by the tapered surface when the sleeve is internally fitted to the open recess portion of the housing, it is easy to internally fit the sleeve to the open recess portion and to prevent the damage of the housing.

It may be preferable that the seal member is an elastic seal member and the open recess portion of the housing is provided with an annular groove on which the elastic seal member is disposed. According to this preferable configuration, since the elastic seal member is disposed in the groove so that the relative movement of the elastic seal member with respect to the housing is regulated, the elastic seal member is difficult to be separated from the housing. Further, since the groove is formed in the housing, it is easy to form a simple groove with high structural strength.

It may be preferable that an annular holder is internally fitted to the sleeve. According to this preferable configuration, since it is possible to increase the structural strength of the sleeve by the internally fitted holder, it is easy to maintain sealing performance by preventing the deformation of the sleeve.

It may be preferable that the sleeve includes a large-diameter portion including the open portion and a small-diameter portion having a diameter smaller than that of the large-diameter portion and the solenoid valve further includes a fixing member that is fixed to the housing so as to come into contact with the large-diameter portion in an axial direction. According to this preferable configuration, since the movement of the sleeve is regulated by the fixing member even when a force in the pull-out direction acts on the sleeve, it is possible to prevent the sleeve from being pulled out with a simple structure.

DESCRIPTION OF EMBODIMENTS

Modes for implementing a solenoid valve according to the present invention will be described based on embodiments.

First Embodiment

A solenoid valve according to a first embodiment of the present invention will be described with reference to FIGS. 1 to 4.

Figure 1:
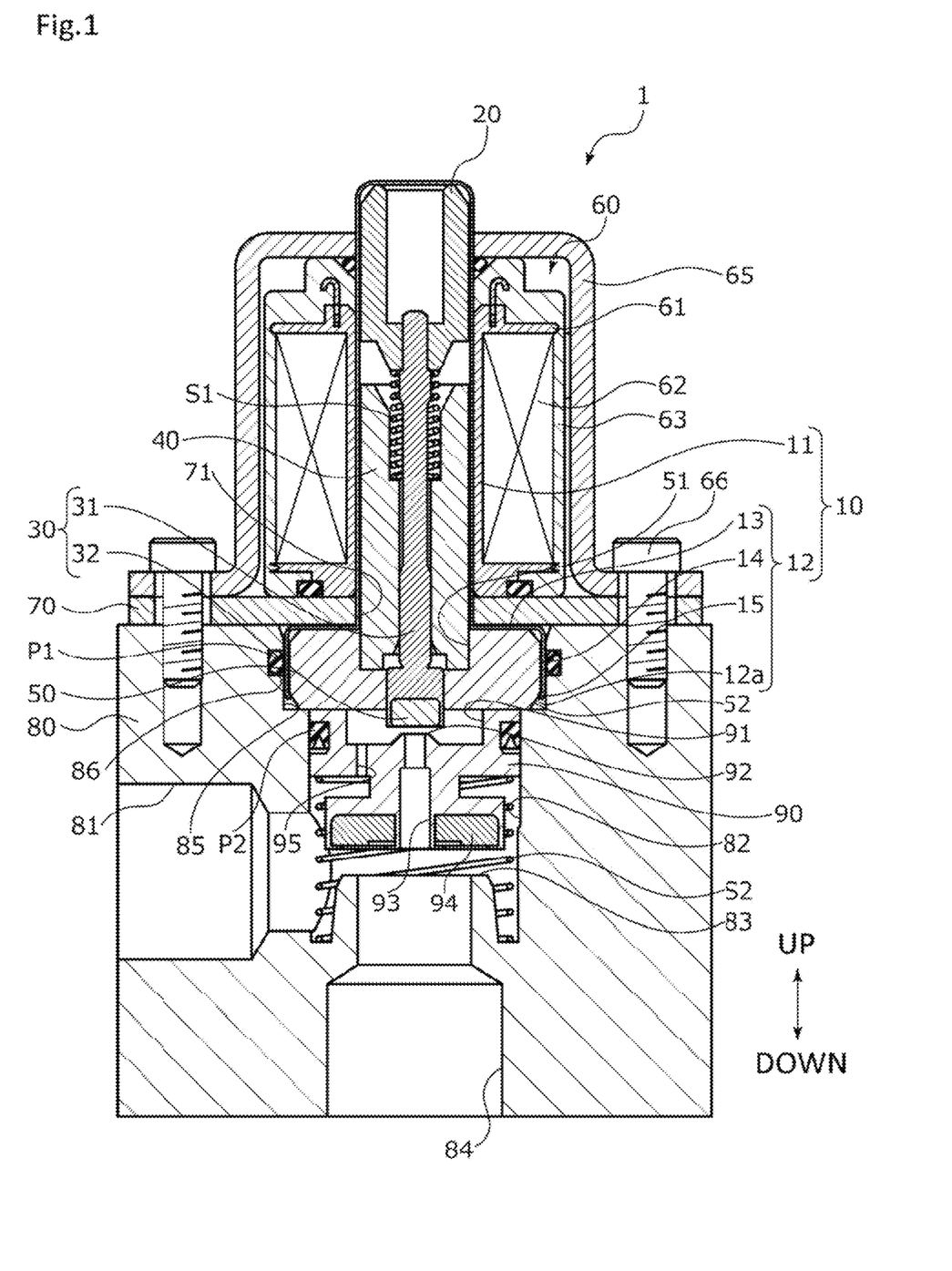
FIG. 1 is a cross-sectional view showing a valve open state of a solenoid valve according to a first embodiment of the present invention.
Figure 2:
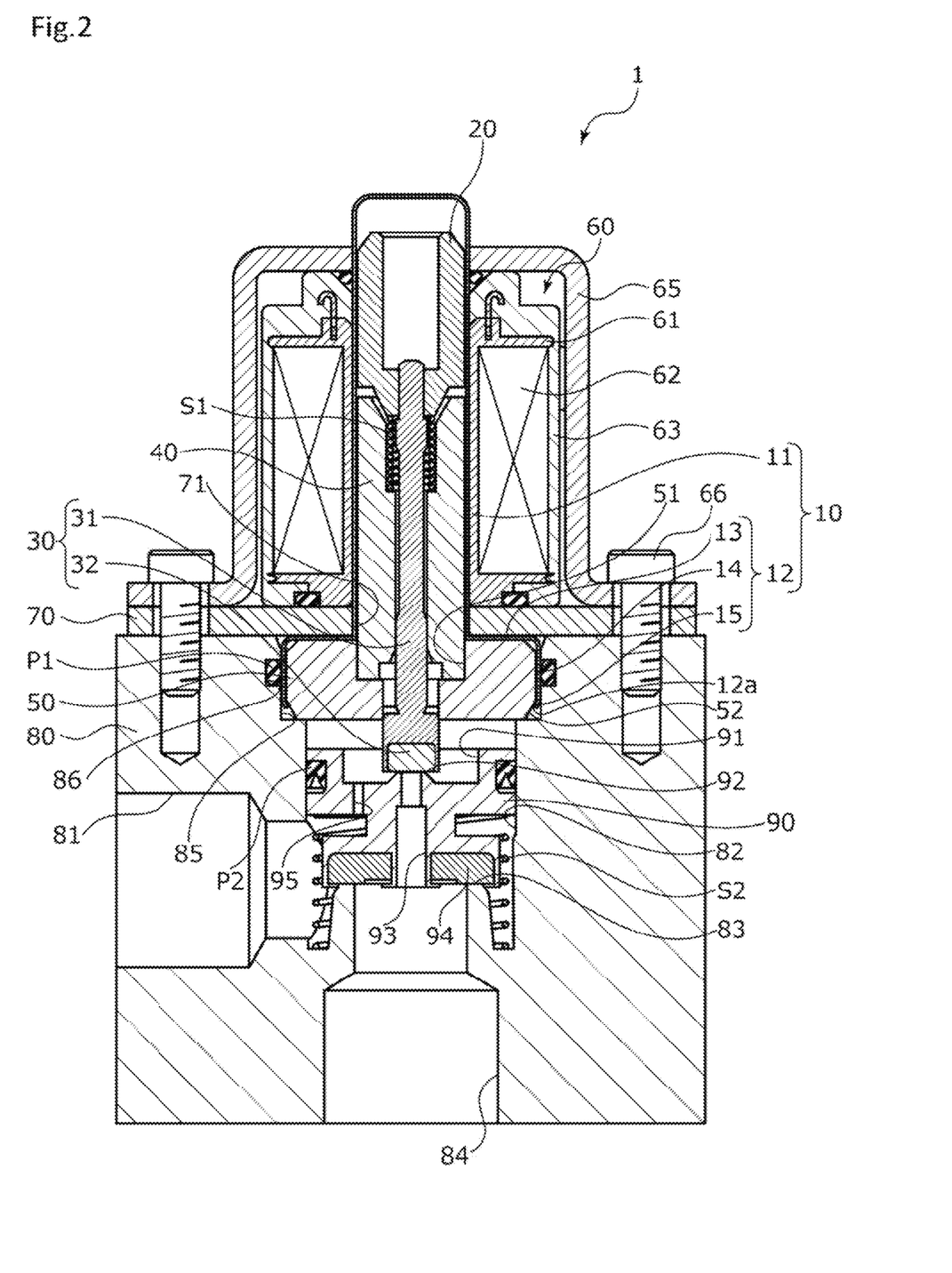
FIG. 2 is a cross-sectional view showing the solenoid valve in a valve closed state in the first embodiment.

As shown in FIGS. 1 and 2, a solenoid valve 1 is an ON-OFF type and normally open type solenoid valve which is opened when power is turned off and is closed when power is turned on and is provided in a flow path of a refrigerant circulating in an air conditioner in order to control the flow of the refrigerant.

The solenoid valve 1 is a pilot type solenoid valve which mainly includes a sleeve 10, a movable iron core 20, a pilot valve body 30, a fixed iron core 40, a holder 50, a solenoid molded body 60, a solenoid casing 65, a plate 70, a housing 80, a main valve body 90, and an O-ring P1 and can be closed by using a pilot pressure acting on the main valve body 90.

The sleeve 10 is formed into a bottomed cylindrical shape having a hammer shape when viewed from the side by press-molding a stainless steel plate and includes a small-diameter portion 11 with a closed portion and a large-diameter portion 12 with an open portion 12a. In addition, the sleeve 10 may be formed of metal other than stainless steel or may be formed of resin.

The small-diameter portion 11 includes a disk-shaped closed portion and a peripheral wall extending in the axial direction substantially orthogonal to the outer radial end of the closed portion. The large-diameter portion 12 includes a diameter larger than that of the small-diameter portion 11 and includes an annular bottom wall 13 which extends in the outer radial direction substantially orthogonal to the axial lower end of the peripheral wall of the small-diameter portion 11, a cylindrical wall 14 which extends in the axial direction substantially orthogonal to the outer radial end of the annular bottom wall 13, and a bend wall 15 which extends to be bent from the lower end of the cylindrical wall 14 toward the inner radial side. The bend wall 15 forms an end portion on the side of a main valve chamber 82 of the large-diameter portion 12.

The movable iron core 20 is formed in a hollow columnar shape by a magnetic metal material such as iron, is disposed inside the small-diameter portion 11 of the sleeve 10, and is movable in the axial direction while the outer peripheral surface is guided by the inner peripheral surface of the sleeve 10.

The pilot valve body 30 includes a rod 31 which extends in the axial direction and a pilot valve body component 32 which is fixed to the lower end portion of the rod 31. The rod 31 is fixed to the movable iron core 20 while the upper end portion is inserted into the through-hole of the movable iron core 20 and is movable in the axial direction in accordance with the movement of the movable iron core 20. Further, the refrigerant can flow in and out of the movable iron core 20 to the upper side and the lower side through a gap between the movable iron core 20 and the sleeve 10.

The fixed iron core 40 is formed in a hollow cylindrical shape having a through-hole penetrating in the axial direction by a magnetic metal material such as iron, most of the fixed iron core 40 is disposed inside the small-diameter portion 11 of the sleeve 10, and the lower end portion which is a part of the fixed iron core 40 is inserted and fitted into a recess portion 51 of the holder 50 and is disposed inside the large-diameter portion 12 of the sleeve 10.

Further, the upper end portion of the fixed iron core 40 is provided with a recess portion which is depressed downward in the axial direction and communicates with the through-hole and a coil spring S1 for urging the movable iron core 20 in a direction moving away from the fixed iron core 40 is disposed in the recess portion.

The holder 50 is formed in a hollow cylindrical shape having a diameter larger than that of the fixed iron core 40 by a magnetic metal material such as iron, is externally fitted and fixed to the lower end portion of the fixed iron core 40, and is internally fitted to the large-diameter portion 12 of the sleeve 10. The recess portion 51 having an annular bottom is formed at a radial center portion to be depressed downward in the axial direction in order from the upper side and a through-hole is formed to communicate with the recess portion 51 and penetrate in the axial direction. Further, the outer periphery of the lower end portion of the holder 50 is provided with a tapered surface 52 which is inclined from the outer radial side toward the inner radial side as it goes downward in the axial direction.

The lower end portion of the fixed iron core 40 is fitted and fixed to the recess portion 51 of the holder 50. In addition, the fixed iron core 40 and the holder 50 are fixed by known methods such as crimping, screwing, and welding, but may not be fixed. Further, if they are not fixed, it is preferable to separately provide regulation means for restricting the movement of the fixed iron core 40 in the axial direction, particularly toward the movable iron core 20.

Further, since the through-hole of the fixed iron core 40 and the through-hole of the holder 50 communicate with each other so that the rod 31 is movable in the axial direction and at least a part of each of the inner peripheral surfaces is formed and disposed to be able to come into contact with the outer peripheral surface of the rod 31, the rod 31 can be guided.

The solenoid molded body 60 is formed by molding a coil 62 as a solenoid coil wound on a bobbin 61 using a resin 63, is externally fitted to the small-diameter portion 11 of the sleeve 10, and is able to generate a magnetic field by causing a current to flow from a connector (not shown) to the coil 62. The solenoid casing 65 is formed in a hat shape having a through-hole on a bottom by a magnetic metal material such as iron and is fixed to the housing 80 by a bolt 66 inserted into a small-insertion hole of a flange formed to extend in the outward radial direction of the solenoid casing 65 while being externally mounted on the solenoid molded body 60. More specifically, the solenoid casing 65 fixed to the housing 80 accommodates the solenoid molded body 60 therein, the small-diameter portion 11 of the sleeve 10 is inserted into the through-hole of the bottom of the solenoid casing 65, and an upper end portion including the closed portion of the small-diameter portion 11 protrudes from the bottom of the solenoid casing 65.

The plate 70 is formed in a rectangular shape and is provided with a large-insertion hole 71 penetrating a radial center portion in the axial direction and a small-insertion hole penetrating the outer radial side end portion in the axial direction and having a diameter smaller than that of the large-insertion hole 71. The large-insertion hole 71 is formed so that the small-diameter portion 11 of the sleeve 10 is insertable thereinto and is formed to be smaller than the solenoid molded body 60 and the large-diameter portion 12 of the sleeve 10. The small-insertion hole of the plate 70 is formed to be aligned to the small-insertion hole of the solenoid casing 65.

The plate 70 is fixed to the housing 80 together with the solenoid casing 65 by the bolt 66 inserted into the small-insertion hole of the plate 70 and the small-insertion hole of the solenoid casing 65 while the small-diameter portion 11 of the sleeve 10 is inserted into the large-insertion hole 71 and is in contact with the annular bottom wall 13 of the large-diameter portion 12 of the sleeve 10. That is, the plate 70 is a fixing member of the present invention that prevents the sleeve 10 from being pulled out.

The housing 80 is provided with an inflow path 81 which is formed of aluminum and communicates with the outside, a main valve chamber 82 which communicates with the inflow path 81, a main valve seat 83, and an outflow path 84 penetrating a radial center portion of the main valve seat 83 in the axial direction and communicating with the outside of the main valve chamber 82 and the housing 80 and a flow path through which a refrigerant flows is formed in order of the inflow path 81, the main valve chamber 82, and the outflow path 84. The main valve body 90 and a coil spring S2 which urges the main valve body 90 in a direction moving away from the main valve seat 83 are disposed in the main valve chamber 82. The main valve chamber 82 and the main valve seat 83 are respectively a valve chamber and a valve seat of the present invention.

Further, the housing 80 is provided with an open recess portion 85 which is formed on the upper side of the main valve chamber 82 to be depressed downward in the axial direction and has an annular bottom and the open recess portion 85 communicates with the outside of the main valve chamber 82 and the housing 80. Further, an annular groove 86 is formed in the side portion of the open recess portion 85 to be depressed to the outward radial side and the O-ring P1 is disposed in the groove 86. A gap between the housing 80 and the large-diameter portion 12 of the sleeve 10 is sealed by this O-ring P1. That is, the O-ring P1 is an elastic seal member which is seal means of the present invention.

The main valve body 90 is formed in a stepped cylindrical shape and is a valve body of the present invention, a wear ring P2 is attached to the upper end portion thereof, and a main valve body component 94 is fixed to the lower end portion. The wear ring P2 slidably comes into contact with the inner peripheral surface of the main valve chamber 82.

Further, a recess portion which is depressed downward in the axial direction, has an annular bottom, and defines a pilot valve chamber 91 to be described later, a pilot valve body valve seat 92, and a large communication path 93 which penetrates a radial center portion of the pilot valve body valve seat 92 and communicates with the lower side of each of the pilot valve chamber 91 and the main valve body 90 in the axial direction are formed in a radial center portion of the main valve body 90 in order from the upper side. Further, a small communication path 95 is formed on the outer radial side of the recess portion to penetrate from the bottom of the recess portion in the axial direction and to have a diameter smaller than that of the large communication path 93.

The pilot valve chamber 91 is a space which is defined by the main valve body 90, the housing 80, the holder 50, and the pilot valve body 30. The volume of the pilot valve chamber 91 decreases as the main valve body 90 moves upward in the axial direction, and the volume of the pilot valve chamber 91 increases as the main valve body 90 moves downward in the axial direction.

Figure 3A:
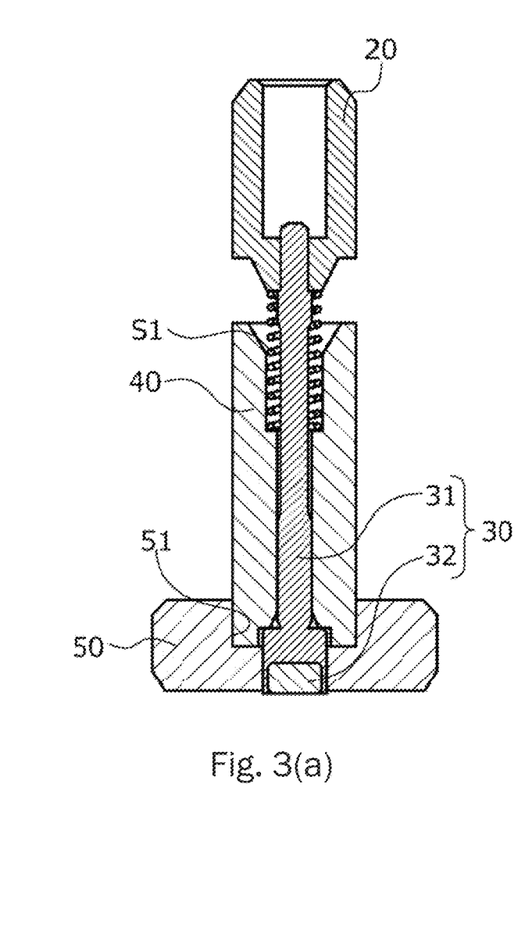
FIGS. 3A and 3B are cross-sectional views for describing an assembly of the solenoid valve in the first embodiment.

Next, an example of an assembly method of the solenoid valve 1 will be described based on FIGS. 3 and 4. First, the lower end portion of the fixed iron core 40 is inserted into the recess portion 51 of the holder 50 and is press-fitted and fixed thereto. Then, the pilot valve body 30 is inserted into the through-hole of the holder 50 from the lower side of the axial direction, the coil spring S1 is externally mounted on the upper end portion of the pilot valve body 30, and the upper end portion of the pilot valve body 30 is inserted into the through-hole of the movable iron core 20 and is caulked and fixed (see FIG. 3A). Since the diameter of the movable iron core 20 and the diameter of the lower end portion of the pilot valve body 30 including the pilot valve body component 32 are larger than the diameter of the through-hole of the fixed iron core 40, it is possible to regulate a case in which the movable iron core 20 and the pilot valve body 30 are pulled out in the axial direction. That is, the movable iron core 20, the pilot valve body 30, the fixed iron core 40, the holder 50, and the coil spring S1 are unitized.

Figure 3B:
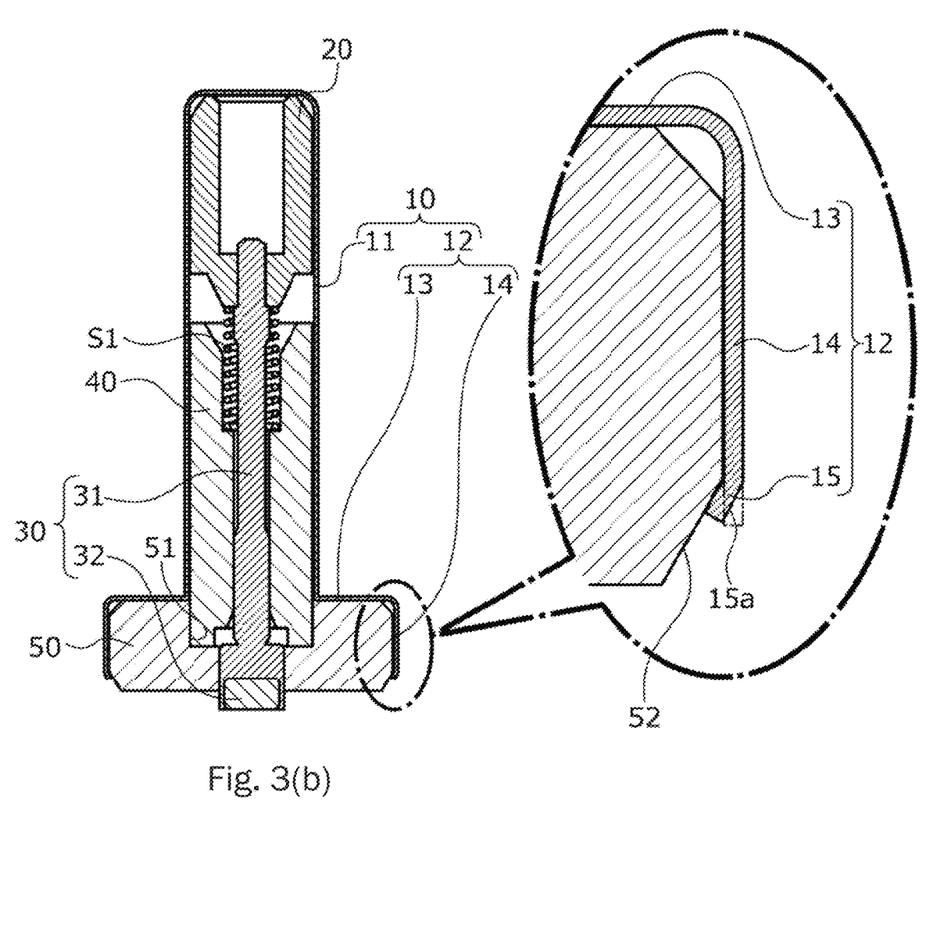

Next, referring to FIG. 3B, the sleeve 10 is externally mounted from the upper side of the unit of the movable iron core 20, the pilot valve body 30, the fixed iron core 40, the holder 50, and the coil spring S1 until the annular bottom wall 13 of the sleeve 10 comes into contact with the upper end surface of the holder 50. At this time, the bend wall 15 (see the solid line of the balloon of FIG. 3B) is not formed at the lower end of the large-diameter portion 12 of the sleeve 10 and the cylindrical wall 14 extends to the lower end of the large-diameter portion 12 in a straight line shape (see the dashed line in the balloon of FIG. 3B). Since the diameter of the cylindrical wall 14 is slightly larger than the diameter of the holder 50, the sleeve can be easily externally mounted. Further, since the annular bottom wall 13 of the sleeve 10 comes into contact with the upper end surface of the holder 50 so that the movement is regulated, the alignment in the axial direction can be performed and the movement of the fixed iron core 40 toward the movable iron core 20 can be regulated. That is, a configuration necessary for regulating the movement of the fixed iron core 40 toward the movable iron core 20 is simplified.

Then, the lower end portion of the cylindrical wall 14 of the large-diameter portion 12 of the sleeve 10 is bent toward the inner radial side to form the bend wall 15 as shown in the solid line of the balloon of FIG. 3B and to be crimped to the holder 50. Accordingly, the sleeve 10, the movable iron core 20, the pilot valve body 30, the fixed iron core 40, the holder 50, and the coil spring S1 can be unitized. Further, the outer peripheral surface of the bend wall 15 is formed as a tapered surface 15a which is inclined from the outer radial side toward the inner radial side as it goes downward in the axial direction.

Since the lower end portion of the cylindrical wall 14 can be bent from a corner which is formed between the tapered surface 52 of the holder 50 and the end surface extending upward from the upper end of the tapered surface 52 and serves as a starting point and the bending is regulated by the tapered surface 52 at the time of bending the lower end portion of the cylindrical wall 14 toward the inner radial side in order to form the bend wall 15, the processing is easy.

Figure 4A:
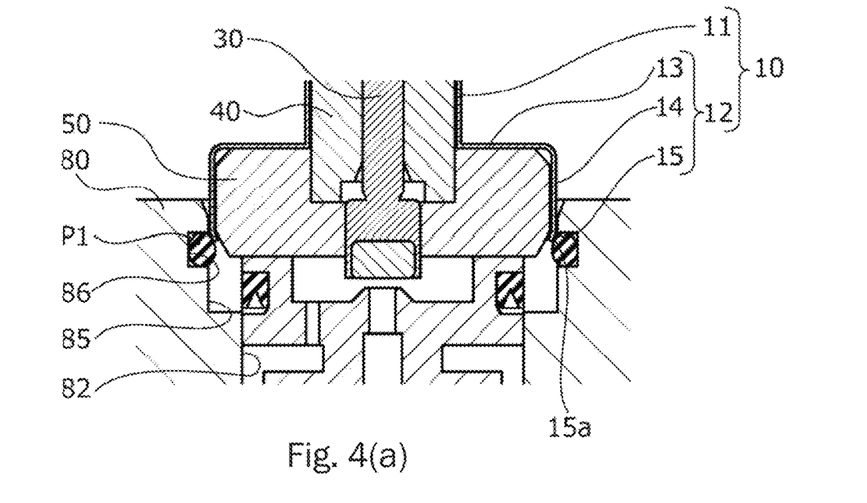
FIGS. 4A to 4C are cross-sectional views for describing an assembly of the solenoid valve subsequently after FIG. 3.
Figure 4B:
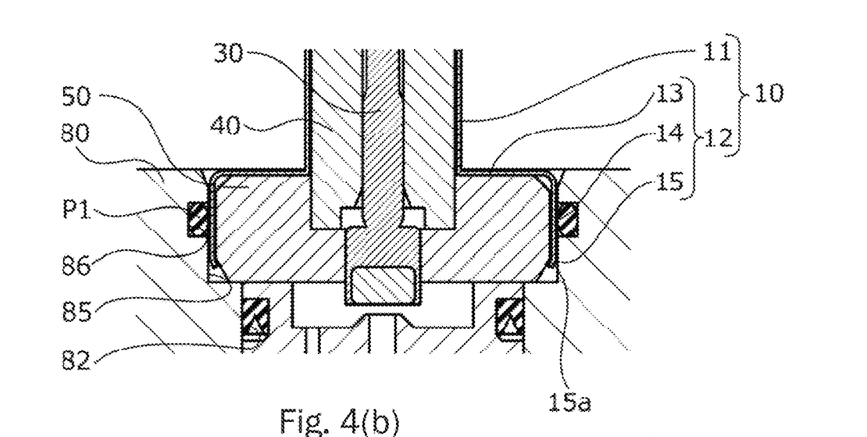

Next, referring to FIGS. 4A and 4B, the large-diameter portion 12 of the unitized sleeve 10 is inserted into the open recess portion 85 of the housing 80 where the coil spring S2 (see FIG. 1), the main valve body 90, and the O-ring P1 are disposed. At this time, since the tapered surface 15a of the bend wall 15 guides the internal fitting of the large-diameter portion 12 to the open recess portion 85 and guides the internal fitting of the large-diameter portion 12 into the O-ring P1, it is easy to internally fit the large-diameter portion 12 to the open recess portion 85 and the O-ring P1 and it is possible to prevent the damage of the housing 80 and the O-ring P1. Further, as shown in FIG. 4B, since the holder 50 comes into contact with the bottom of the open recess portion 85 so that the movement is regulated, the positioning is easy.

Figure 4C:
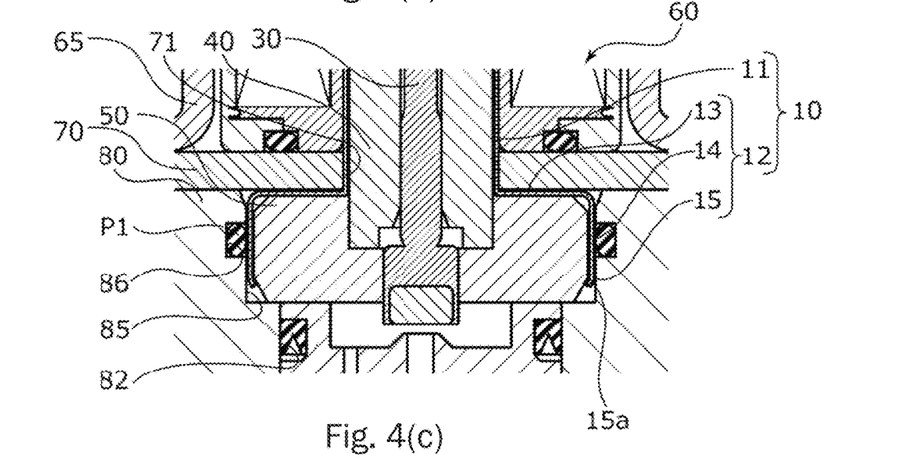

Then, referring to FIG. 4C, the small-diameter portion 11 of the sleeve 10 is inserted through the large-insertion hole 71 of the plate 70 so that the plate 70 comes into contact with the upper end surface of the annular bottom wall 13 of the sleeve 10 and the upper end surface of the housing 80 forming substantially the same plane.

Further, the solenoid molded body 60 is externally fitted to the small-diameter portion 11 of the sleeve 10 to be placed on the plate 70, the solenoid casing 65 is externally mounted, and the solenoid casing 65 is fixed to the housing 80 with the plate 70 interposed therebetween by the bolt 66 (see FIG. 1), so that the solenoid valve 1 can be assembled as shown in FIG. 4C.

Further, in the assembled solenoid valve 1, the dimension from the bottom of the open recess portion 85 to the lower end of the plate 70 which is the axial dimension of the open recess portion 85 is substantially the same as the dimension from the lower end of the holder 50 to the upper end of the annular bottom wall 13, that is, the sum of the thickness dimensions of the annular bottom wall 13 and the holder 50. Accordingly, since the annular bottom wall 13 and the holder 50 are sandwiched while respectively contacting the bottom of the open recess portion 85 and the plate 70, the movement in the axial direction is regulated and the solenoid valve can be maintained in a stable state even when an external force such as a pressure or vibration is applied from the refrigerant to the sleeve 10.

Next, an operation of the solenoid valve 1 will be described. In the solenoid valve 1, in a state in which a current is not supplied to the coil 62 of the solenoid molded body 60, the movable iron core 20 is disposed on the upper side to be separated from the fixed iron core 40 due to the urging force of the coil spring S1 and the pilot valve body component 32 is separated from the pilot valve body valve seat 92. Accordingly, since a part of the refrigerant flowing into the main valve chamber 82 of the housing 80 flows into the pilot valve chamber 91 through the small communication path 95 of the main valve body 90 and can flow out toward the outflow path 84 of the main valve chamber 82 through the large communication path 93, the pilot pressure of the pilot valve chamber 91 is substantially the same as the pressure on the side of the main valve seat 83 of the main valve chamber 82. At this time, the urging force of the coil spring S2 acts on the main valve body 90. Then, as shown in FIG. 1, the main valve body 90 is in contact with the lower end surface of the holder 50 and the main valve body component 94 of the main valve body 90 is separated from the main valve seat 83, that is, the valve is opened.

On the other hand, in the closed solenoid valve 1, when a current is caused to flow to the coil 62 of the solenoid molded body 60, the fixed iron core 40 and the holder 50 are magnetized. Since the fixed iron core 40 is disposed along the axial direction with respect to the coil 62 and the holder 50 is disposed along the radial direction with respect to the coil 62, that is, the fixed iron core 40 and the holder 50 are disposed to follow a magnetic field formed by the coil 62, the fixed iron core 40 and the holder 50 form a magnetic circuit and generate a strong magnetic force.

When the fixed iron core 40 and the holder 50 are magnetized, the movable iron core 20 which takes the magnetic force can be pulled toward the fixed iron core 40 while resisting the urging force of the coil spring S1 and moves downward in the axial direction. At this time, since a part of the refrigerant flows in and out of the movable iron core 20 and the pilot valve body 30 to the upper end side and the lower end side and a force acting from both sides of the axial direction is balanced, it is possible to prevent the refrigerant flowing into the sleeve 10 from disturbing the movement of the movable iron core 20 and to smoothly move the movable iron core 20 and the pilot valve body 30. The same applies to a case in which the energization is stopped and the movable iron core 20 moves upward in the axial direction by the urging force of the coil spring S1.

Then, when the pilot valve body 30 also moves downward in the axial direction in accordance with the operation in which the movable iron core 20 is pulled toward the fixed iron core 40 and the pilot valve body component 32 is seated on the pilot valve body valve seat 92 of the main valve body 90, the refrigerant inside the pilot valve chamber 91 cannot flow out from the large communication path 93 into the main valve chamber 82. Accordingly, the pilot pressure of the pilot valve chamber 91 becomes relatively higher than the pressure on the side of the main valve seat 83 of the main valve chamber 82.

When the resultant force of the force that pulls the movable iron core by the magnetic force and the force based on the pressure difference acting on the main valve body 90 exceeds the resultant force of the urging force of the coil spring S1 and the urging force of the coil spring S2, the main valve body 90 moves toward the main valve seat 83 together with the pilot valve body 30 against the urging force of the coil spring S2 and the main valve body component 94 of the main valve body 90 is seated on the main valve seat 83 so that the solenoid valve 1 is closed as shown in FIG. 2. In this way, since the main valve body 90 is moved by the pilot pressure, the power required to generate a magnetic field can be saved.

Further, in the closed solenoid valve 1, when the supply of a current to the coil 62 of the solenoid molded body 60 is stopped, the movable iron core 20 moves upward due to the urging force of the coil spring S1. Accordingly, since the refrigerant inside the pilot valve chamber 91 flows from the large communication path 93 into the main valve chamber 82, a difference between the pilot pressure of the pilot valve chamber 91 and the pressure on the side of the main valve seat 83 of the main valve chamber 82 decreases and the main valve body 90 moves upward due to the urging force of the coil spring S2 so that the valve is closed as shown in FIG. 1.

As described above, in the solenoid valve 1 of this embodiment, since a gap between the sleeve 10 and the housing 80 is sealed by one O-ring P1, it is possible to prevent the refrigerant from leaking to the outside. That is, since it is possible to ensure sealing performance of a space on the side of the refrigerant by sealing a gap between the sleeve 10 and the housing 80 at one place, the manufacturing process can be simplified.

Further, in the solenoid valve 1, since the O-ring P1 disposed between the sleeve 10 and the housing 80 is crushed in the radial direction, it is easy to maintain the crushing rate of the O-ring P1 even when the sleeve 10 moves in the axial direction. As a result, it is easy to maintain sealing performance.

Further, in the solenoid valve 1, since the O-ring P1 is disposed in the groove 86 of the housing 80, the relative movement of the O-ring P1 with respect to the housing 80 in the axial direction is regulated. Accordingly, the O-ring P1 is not easily separated from the housing 80. Further, since the groove 86 is formed in the aluminum housing 80 and the thickness of the portion forming the groove 86 is larger than the plate thickness of at least the sleeve 10, the configuration is simple and the structural strength is high.

Further, in the solenoid valve 1, since the structural strength of the large-diameter portion 12 of the sleeve 10 can be increased by the holder 50, it is possible to prevent the deformation of the large-diameter portion 12 and to easily maintain sealing performance.

Further, in the solenoid valve 1, since the annular bottom wall 13 of the sleeve 10 is in contact with the plate 70 and the movement of the sleeve 10 is regulated even when a pressure or an external force acts on the sleeve 10 in the pull-out direction, it is possible to prevent the sleeve 10 from being pulled out with a simple structure. Additionally, in this embodiment, the annular bottom wall 13 of the sleeve 10 is always in contact with the plate 70, but the flange of the sleeve is not always in contact with the plate 70. Also in such a case, when the sleeve moves in the pull-out direction, the flange comes into contact with the plate 70 and the movement is regulated so that the pull-out can be prevented.

Further, since the stop position of the main valve body 90 is determined by the lower end surface of the holder 50 when a current is not supplied to the solenoid valve 1, the structure can be simplified.

Second Embodiment

Figure 5:
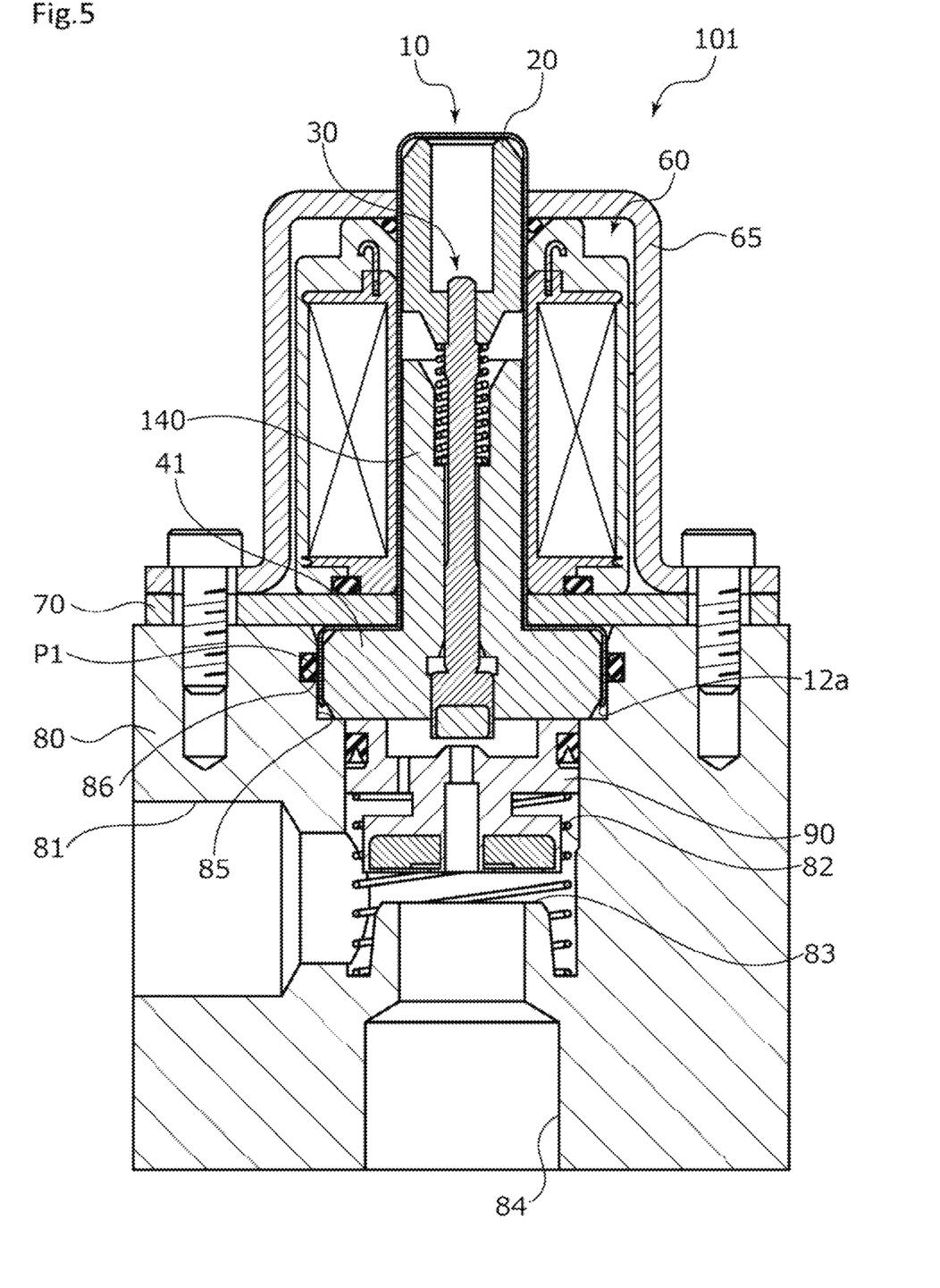
FIG. 5 is a cross-sectional view showing a solenoid valve according to a second embodiment of the present invention.

Next, a solenoid valve 101 according to a second embodiment of the present invention will be described with reference to FIG. 5. The redundant description of the same configuration as that of the first embodiment will be omitted. A fixed iron core 140 of the solenoid valve 101 is formed in a shape in which the lower end portion is provided with a flange portion 41 extending toward the outer radial side and the fixed iron core 40 and the holder 50 of the first embodiment are integrally formed with each other. In such a configuration, a process of fixing the fixed iron core 40 and the holder 50 can be omitted.

Third Embodiment

Figure 6:
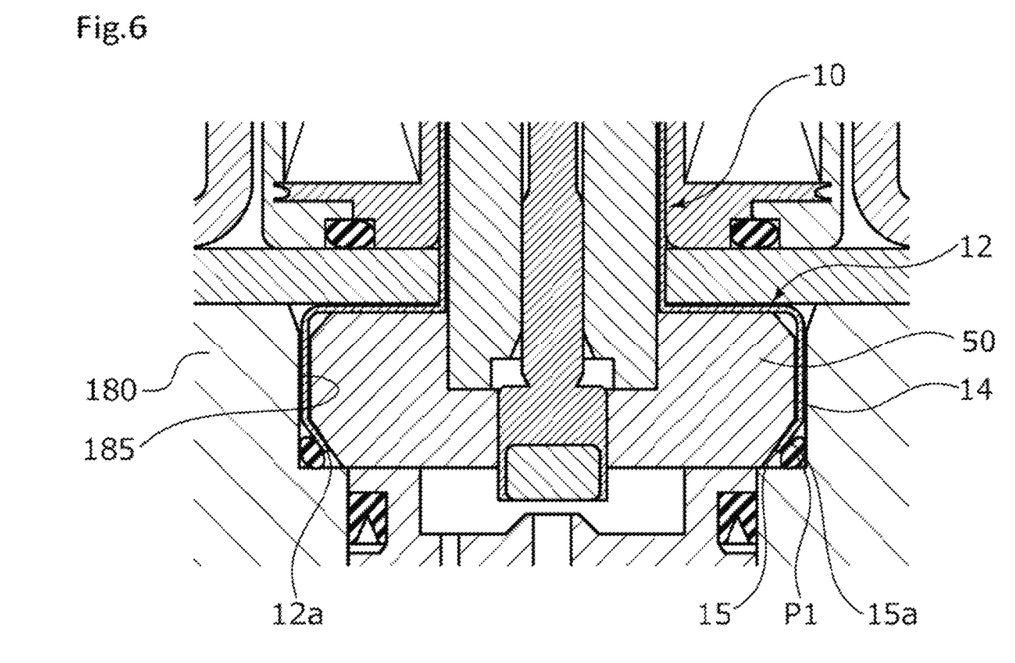
FIG. 6 is a cross-sectional view showing a solenoid valve according to a third embodiment of the present invention.

Next, a solenoid valve according to a third embodiment of the present invention will be described with reference to FIG. 6. The redundant description of the same configuration as that of the first embodiment will be omitted. In an open recess portion 185 of a housing 180, the O-ring P1 is disposed on a corner between the inner peripheral surface and the annular bottom and a gap between the housing 180 and the sleeve 10 is sealed. Also in such a configuration, it is possible to ensure sealing performance of a space on the side of the refrigerant by sealing one place. That is, a position where the O-ring is disposed may be changed appropriately if sealing performance of a space on the side of the refrigerant can be ensured by sealing a gap between the sleeve and the housing at one place.

Further, since the O-ring P1 is disposed on the corner between the inner peripheral surface and the annular bottom in the open recess portion 185 of the housing 180, the groove 86 described in the first embodiment is not provided and hence the housing 180 can be easily manufactured.

Further, a gap between the holder and the housing may be sealed by the O-ring if a gap between the sleeve and the holder is sealed and an annular groove where the O-ring can be disposed may be formed on the bottom of the open recess portion if a gap between the holder and the housing is sealed by the O-ring. In this case, since the radial movement of the O-ring with respect to the housing is regulated, the O-ring is not easily separated from the housing.

Fourth Embodiment

Figure 7:
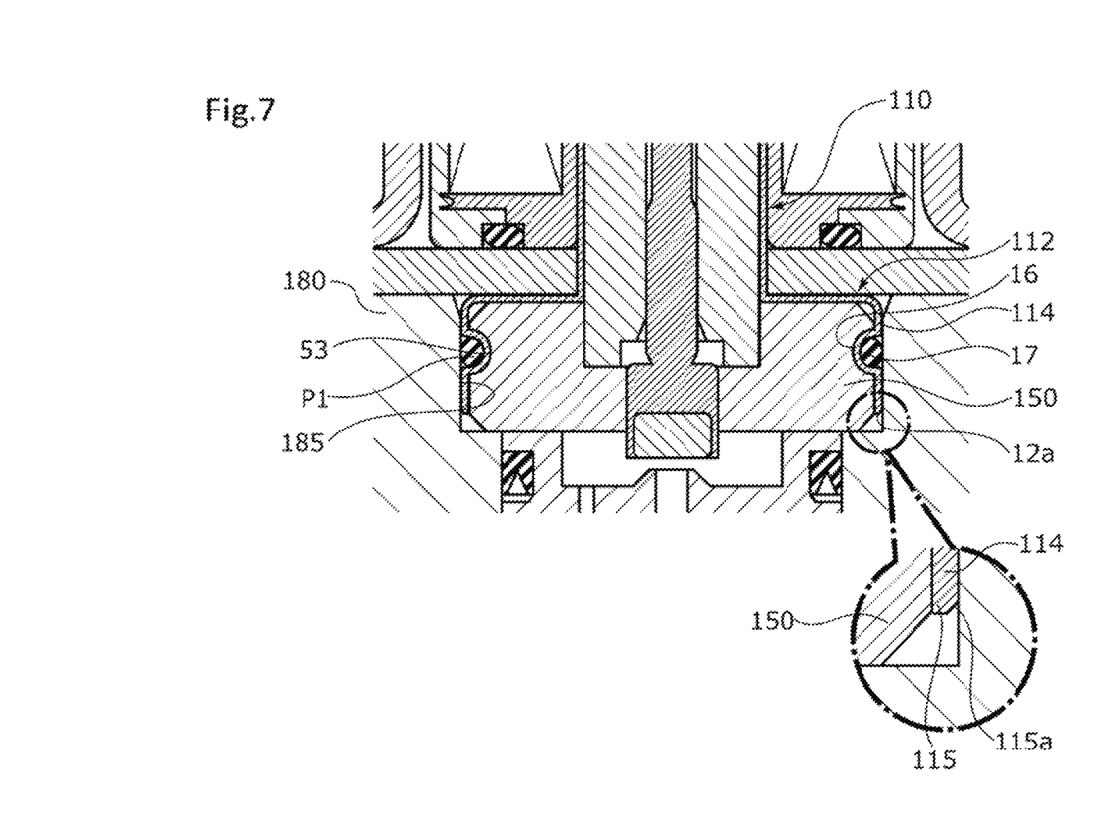
FIG. 7 is a cross-sectional view showing a solenoid valve according to a fourth embodiment of the present invention.

Next, a solenoid valve according to a fourth embodiment of the present invention will be described with reference to FIG. 7. The redundant description of the same configuration as that of the first embodiment will be omitted. A large-diameter portion 112 of a sleeve 110 includes an annular protrusion 16 which is formed on the axial center side of a cylindrical wall 114 to protrude toward the inner radial side and a tapered end portion 115 (specifically, see the inside of the balloon of FIG. 7) which is an axial lower end portion of the cylindrical wall 114, is provided with a tapered surface 115a inclined from the outer radial side toward the inner radial side as it goes downward in the axial direction, and is an end portion on the side of the valve chamber of the present invention, and an annular groove 17 is formed on the outer radial side of the annular protrusion 16 to be depressed toward the inner radial side. The holder 150 includes an annular groove 53 which is formed to be positioned to the annular protrusion 16.

Regarding the internal fitting of the holder 150, the holder 150 is pressed into the large-diameter portion 112 of the sleeve 110 and is moved while elastically deforming the cylindrical wall 114 so that the cylindrical wall 114 is enlarged toward the outer radial side. Then, when the annular protrusion 16 reaches the annular groove 53, the cylindrical wall 114 is elastically restored, the annular protrusion 16 is inserted and fitted to the annular groove 53, and the holder 150 can be internally fitted to the large-diameter portion 112 so as not to be pulled out. That is, it is possible to omit a process of crimping the lower end portion of the large-diameter portion 12 as in the first embodiment.

Further, since the tapered surface 115a is formed, it is easy to perform the internal fitting to the O-ring P1 and it is possible to prevent the damage of the O-ring P1 similarly to the first embodiment. Further, the annular groove 17 can regulate the axial movement of the O-ring P1.

Although a case has been described in which the holder 150 is internally fitted by using the elasticity of the cylindrical wall 114 of the sleeve 110, the present invention is not limited thereto. For example, the internal fitting may be performed by enlarging the cylindrical wall 114 by thermal expansion, inserting the holder 150, and cooling the cylindrical wall 114. Alternatively, the holder 150 may be inserted into the cylindrical wall and the cylindrical wall may be crimped to the holder 150 to form and fix the annular protrusion 16 and the annular groove 17.

Fifth Embodiment

Figure 8:
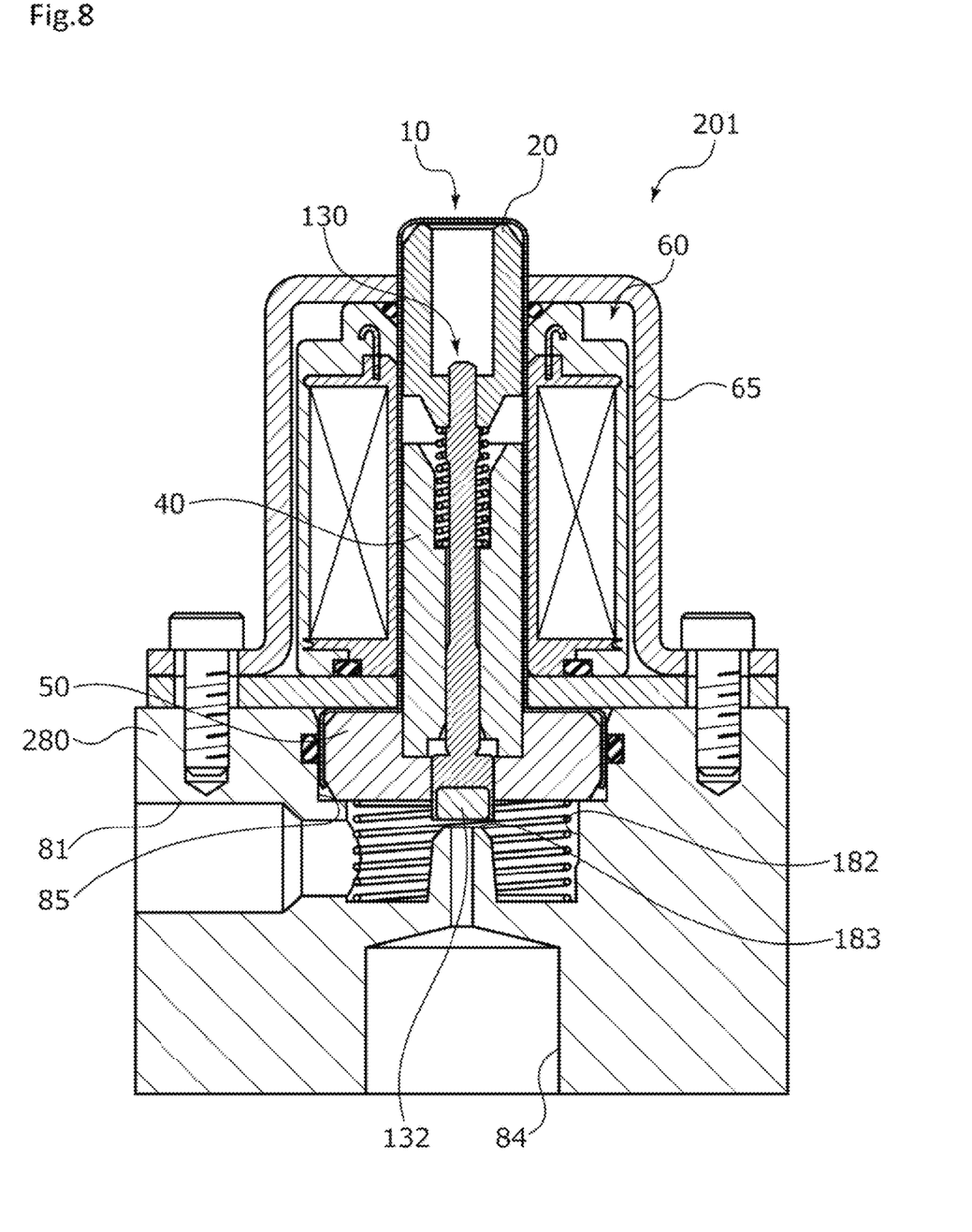
FIG. 8 is a cross-sectional view showing a solenoid valve according to a fifth embodiment of the present invention.

Next, a solenoid valve according to a fifth embodiment of the present invention will be described with reference to FIG. 8. The redundant description of the same configuration as that of the first embodiment will be omitted. A housing 280 of a solenoid valve 201 includes a valve chamber 182 which communicates with the inflow path 81 and a valve seat 183 which is formed inside the valve chamber 182 and a valve body component 132 of the valve body 130 can be seated on the valve seat 183. In this way, the solenoid valve of the present invention is not limited to the pilot type.

Although the embodiments of the present invention have been described with reference to the drawings, a detailed configuration is not limited to these embodiments and modifications or additions in the scope of the present invention are also included in the present invention.

For example, in the above-described embodiments, a case has been described in which the solenoid valve is of the ON-OFF type, the present invention is not limited thereto and the valve opening degree may be adjusted gradually.

A case has been described in which the solenoid valve is of the normally open type, the present invention is not limited thereto and the solenoid valve may be of a normally closed type.

A case has been described in which the solenoid valve is used for the air conditioner, the present invention is not limited thereto and the solenoid valve may be used for a device controlled by an oil pressure such as an automatic transmission of a vehicle, a water heater, or the like. Then, the solenoid valve is not limited to those used for air conditioners.

Although a case has been described in which the sleeve and the housing are sealed by the O-ring, the present invention is not limited thereto and the sleeve and the housing may be sealed by seal means such as welding or caulking.

Although a case has been described in which the sleeve is formed in a hammer shape in the side view, the present invention is not limited thereto and the sleeve may be formed in a rectangular shape or a dome shape in the side view. Then, the shape may be modified appropriately.

Although a case has been described in which the fixing member is the plate 70, the present invention is not limited thereto and a rod-shaped member, a claw-shaped member, or the like may be used as the fixing member as long as they are disposed to be in contact with the large-diameter portion. Then, welding, caulking, or the like may be used.

Although a case has been described in which the open recess portion 85 is provided with the annular bottom and the holder comes into contact with the bottom to be positioned, the present invention is not limited thereto and the open recess portion may straightly communicate with the main valve chamber without having the bottom. In such a case, the sleeve may be firmly fixed to the housing by welding or the like or regulation means for regulating the movement of the holder may be provided separately.

Although a case has been described in which the main valve body 90 comes into contact with the holder 50 at the time of opening the valve, the present invention is not limited thereto and the main valve body 90 may be separated from the holder 50. In such a case, regulation means for regulating the movement of the main valve body 90 may be provided separately.

REFERENCE SIGNS LIST

1 Solenoid valve
10 Sleeve
11 Small-diameter portion
12 Large-diameter portion
12a Open portion
15 Bend wall (end portion)
15a Tapered surface
20 Movable iron core
30 Pilot valve body
40 Fixed iron core
50 Holder
62 Coil (solenoid coil)
70 Plate (fixing member)
80 Housing
82 Main valve chamber (valve chamber)
83 Main valve seat (valve seat)
85 Open recess portion
86 Groove
90 Main valve body (valve body)
101, 201 Solenoid valve
110 Sleeve
112 Large-diameter portion
115 Tapered end portion (end portion)
115a Tapered surface
130 Valve body
140 Fixed iron core
150 Holder
180, 280 Housing
182 Valve chamber
183 Valve seat
185 Open recess portion
P1 O-ring (seal member, elastic seal member)

The invention claimed is:

1. A solenoid valve comprising:
a valve body;
a housing which includes a valve seat and a valve chamber;
a rod;
a movable iron core which moves the valve body through the rod;
a solenoid coil;
a fixed iron core formed in a cylindrical shape and configured for moving the movable iron core by causing a current to flow to the solenoid coil;
a holder provided with a recess portion into which an axial end of the fixed iron core on a side of the valve chamber is inserted and fitted; and
a sleeve in which the movable iron core is disposed,
wherein the solenoid coil is disposed outside the sleeve,
the fixed iron core is disposed inside the sleeve,
the movable iron core is disposed inside of the sleeve such that the fixed iron core is positioned between the movable iron core and the valve body,
the rod passes through the fixed iron core in an axial direction,
the sleeve is attached to the housing in such a manner that an open portion of the sleeve is inserted into an open recess portion of the housing, the open recess portion communicating with the valve chamber,
wherein a gap between the sleeve and the housing is sealed by a seal member,
the axial end of the holder is provided with a tapered surface which is inclined from an outer radial side toward an inner radial side,
an axial end of the sleeve on a side of the open portion of the sleeve has a bend wall, and
the axial end of the sleeve is crimped to the tapered surface of the holder such that the bend wall of the sleeve has a tapered surface.

2. The solenoid valve according to claim 1,
wherein the seal member is an elastic seal member, and the elastic seal member is disposed on an outer periphery of the sleeve.

3. The solenoid valve according to claim 2,
wherein the sleeve has a tapered surface formed on an outer periphery of an end portion of the sleeve on a side of the valve chamber, the tapered surface being inclined so as to become smaller in diameter toward the side of the valve chamber.

4. The solenoid valve according to claim 2,
wherein the seal member is an elastic seal member, and the open recess portion of the housing is provided with an annular groove on which the elastic seal member is disposed.

5. The solenoid valve according to claim 2,
wherein an annular holder is internally fitted to the sleeve.

6. The solenoid valve according to claim 2,
wherein the sleeve includes a large-diameter portion including the open portion and a small-diameter portion having a diameter smaller than that of the large-diameter portion, and wherein the solenoid valve further comprises a fixing member that is fixed to the housing so as to come into contact with the large-diameter portion in the axial direction.

7. The solenoid valve according to claim 1,
wherein the seal member is an elastic seal member, and the open recess portion of the housing is provided with an annular groove on which the elastic seal member is disposed.

8. The solenoid valve according to claim 7,
wherein an annular holder is internally fitted to the sleeve.

9. The solenoid valve according to claim 7,
wherein the sleeve includes a large-diameter portion including the open portion and a small-diameter portion having a diameter smaller than that of the large-diameter portion, and wherein the solenoid valve further comprises a fixing member that is fixed to the housing so as to come into contact with the large-diameter portion in the axial direction.

10. The solenoid valve according to claim 1,
wherein the sleeve includes a large-diameter portion including the open portion and a small-diameter portion having a diameter smaller than that of the large-diameter portion, and wherein the solenoid valve further comprises a fixing member that is fixed to the housing so as to come into contact with the large-diameter portion in the axial direction.

11. A solenoid valve comprising:
a valve body;
a housing which includes a valve seat and a valve chamber;
a rod;
a movable iron core which moves the valve body through the rod;
a solenoid coil;
a fixed iron core formed in a cylindrical shape and configured for moving the movable iron core by causing a current to flow to the solenoid coil; and
a sleeve in which the movable iron core is disposed,
wherein the solenoid coil is disposed outside the sleeve,
the fixed iron core is disposed inside the sleeve,
the movable iron core is disposed inside of the sleeve such that the fixed iron core is positioned between the movable iron core and the valve body,
the rod passes through the fixed iron core in an axial direction,
the sleeve is attached to the housing in such a manner that an open portion of the sleeve is inserted into an open recess portion of the housing, the open recess portion communicating with the valve chamber,
wherein a gap between the sleeve and the housing is sealed by a seal member,
the axial end of the fixed iron core on a side of the open recess portion of the housing is provided with a tapered surface which is inclined from an outer radial side toward an inner radial side,
an axial end of the sleeve on a side of the open portion of the sleeve has a bend wall, and
the axial end of the sleeve is crimped to the tapered surface of the fixed iron core such that the bend wall of the sleeve has a tapered surface.

12. The solenoid valve according to claim 11,
wherein the seal member is an elastic seal member, and the elastic seal member is disposed on an outer periphery of the sleeve.

13. The solenoid valve according to claim 11,
wherein the seal member is an elastic seal member, and the open recess portion of the housing is provided with an annular groove on which the elastic seal member is disposed.

14. The solenoid valve according to claim 11,
wherein the sleeve includes a large-diameter portion including the open portion and a small-diameter portion having a diameter smaller than that of the large-diameter portion, and wherein the solenoid valve further comprises a fixing member that is fixed to the housing so as to come into contact with the large-diameter portion in the axial direction.

* * * * *